(12) United States Patent
Maffeis (10) Patent No.: US 7,931,420 B2
(45) Date of Patent: Apr. 26, 2011

(54) MULTIVALENT SECTION FOR MAKING FRAMES, SUPPORTS, SUPPORTING STRUCTURES AND THE LIKE

(75) Inventor: Giuseppe Maffeis, Roncadelle (IT)

(73) Assignee: Gimatic S.p.A, Roncadelle (IT)

( * ) Notice: Subject to any disclaimer, the term of this patent is extended or adjusted under 35 U.S.C. 154(b) by 529 days.

(21) Appl. No.: 11/270,175

(22) Filed: Nov. 9, 2005

(65) Prior Publication Data

US 2006/0115321 A1    Jun. 1, 2006

(51) Int. Cl.
*F16B 7/04*    (2006.01)
(52) U.S. Cl. .................. 403/400; 403/387; 248/298.1
(58) Field of Classification Search .............. 403/231.1, 403/234, 237, 385, 387, 389, 396; 248/225.11, 248/244–246; 52/655.1, 656.9
See application file for complete search history.

(56) References Cited

U.S. PATENT DOCUMENTS

| | | | | |
|---|---|---|---|---|
| 2,940,718 A | * | 6/1960 | Beal | 248/245 |
| 4,017,199 A | * | 4/1977 | Strassle | 403/264 |
| 4,163,537 A | * | 8/1979 | Mourgue | |
| 4,583,359 A | * | 4/1986 | Staeger | 52/653.2 |
| 5,127,758 A | * | 7/1992 | Kreusel | 403/174 |
| 5,481,842 A | * | 1/1996 | Gautreau | 403/231 |
| 5,690,239 A | * | 11/1997 | Ballard | |
| 6,349,912 B1 | * | 2/2002 | Schauss et al. | 248/298.1 |
| 6,974,276 B2 | * | 12/2005 | Kirchner et al. | 403/174 |

FOREIGN PATENT DOCUMENTS

| | | | |
|---|---|---|---|
| DE | 29905687 U1 | * | 7/1999 |
| DE | 20012779 U1 | * | 11/2001 |
| DE | 102004020626 | * | 11/2005 |
| EP | 1087151 A2 | * | 3/2001 |
| EP | 1420172 A1 | * | 5/2004 |
| JP | 2004176752 A | * | 6/2004 |

* cited by examiner

*Primary Examiner* — Joshua T Kennedy
(74) *Attorney, Agent, or Firm* — McGlew and Tuttle, P.C.

(57) ABSTRACT

A section element for constructing frames, supporting structures and the like made up of a section body (10) having one or more flat surfaces (11) and one or more rounded sectors (12) as parts of a circumference with a preset diameter. In correspondence with each flat surface (11) a longitudinal groove (13) is provided with parallel borders defining undercuts (15). The section body can be connected to other elements by means of clamps (16) each one delimiting at least one cylindrical in diameter housing matching that of the cylindrical surface defined by the rounded sectors of the section body and having at least one additional centering member designed to fit in the groove along at least one of the flat surfaces.

16 Claims, 6 Drawing Sheets

FIG. 15

MULTIVALENT SECTION FOR MAKING FRAMES, SUPPORTS, SUPPORTING STRUCTURES AND THE LIKE

FIELD OF THE INVENTION

This invention concerns an innovative section element in the form of a bar usable in particular, but nor exclusively, in making frames, supports, supporting structures and the like.

STATE OF THE TECHNIQUE

In making frames, supports, supporting structures and the like, both on a plane and three dimensional, at present tubular elements or even round cross section or polygonal cross section bars, mostly square are provided and used, with relative advantages and disadvantages that technicians working in the field are well acquainted with.

Usually, the tubular elements, that is the tubes for this use, are extruded, and joined when used in modular structures by means of linear, parallel, at an angle, T or three way, cross-shaped, etc. couplings or clamps, depending on the configuration of the structure to be made. The round cross-sectioned tubes do not require either constraints or limitations as regards to being fitted at an angle in the clamps or of the latter being fitted around the tubes. With polygonal cross-sectioned tubes on the other hand, the clamps have set positions, associated with the faces of each tube.

However, specific clamps are required for round tubes and other types of clamps for four-sided or polygonal tubes, in that the clamps for round tubes cannot be used for polygonal tubes, and vice versa. At the most, clamps for tubes with one cross-section shape are used in connecting the tubes with another cross-section shape, but with the use of and interposition of adaptors. In addition, for a possible combination of round tubes with square tubes for the same structure, clamps are required which have both a round and a square cross-section housing corresponding to the different tubes that require connecting.

Therefore it is evident, in the same way as for the composition of frames, supports and supporting structures according to the known technique, besides tubular elements with round and square cross-sections, there must be available at least two distinct series of clamps with different configurations that, also taking into consideration the various dimensions that tube cross-sections may have, implies making and having available, a large number of components that have a negative influence on tooling, construction and storing costs.

OBJECTS AND SUMMARY OF THE INVENTION

The main object of this invention is to create the conditions by which a single extruded section may be sufficient and be used indifferently both as a tube or bar having a circular cross-section and as a tube o bar having a square, that is polygonal, cross-section, along any part of its length.

Another object of the invention is to provide a section element of aluminium or similar for forming frames, supports, etc, in which the characteristics of the round tubes and the square or polygonal tubes or bars with respective advantages are combined together and integrated.

Still another object of the invention is to provide a multivalent section element suitable to be combined with and connected both to other similar sections and with round tubes by the same type of connecting clamps.

Another object of the invention is to provide a section element which can be combined also with traditional round and square tubes by means of the usual clamps available on the market having compatible sizes.

Yet another object of the invention is to propose linear, at an angle, three-way, cruciform, etc. clamps, suitable for coupling both with the round and square, that is polygonal, component of the section element without limitations as regards to angular position when associated with the round component and with preset orientation when associated with square or polygonal component.

These object and implicit advantages which follow are achieved, according to the invention, with a section element characterized by a body having peripherally one or more flat surfaces and for the rest one or more circular sectors as part of a circumference, and in line with each flat surface a longitudinal groove with parallel borders forming undercuts, and wherein connecting clamps are associable to said section element, each forming at least one cylindrical housing having a diameter corresponding to that of a cylindrical surface formed by the circular sectors of the section body and at least an additional means of centring designed to engage the groove along at least one of said flat surfaces.

The flat surfaces of the section element can be advantageously, but not exclusively, four in number; correspondingly there will be four circular sectors, alternating with the flat surface. Thus, said flat surfaces correspond to the same number of parts of the sides of a square prism for a use of the section element such as a tube or bar having a square cross-section, whereas the rounded sectors correspond to the same number of parts of a cylindrical surface for a use of the section element like a round bar or tube, the flat surfaces resulting inside the cylindrical surface formed by the rounded sectors.

BRIEF DESCRIPTION OF THE DRAWINGS

The invention will however be illustrated more in detail in the continuation of this description made with reference to the enclosed indicative and not limiting drawings, in which.

DETAILED DESCRIPTION OF THE INVENTION

As shown, the section element of the invention includes a section body 10 with a prevalent length dimension and having, peripherally, in cross sections, one or more flat surfaces 11, the remainder of the surface sectors being round 12.

The section body 10 can be made by extruding aluminium or its alloys of preference with four flat surfaces 11 that alternate with an equal number of rounded sectors 12. In the section body seen as a whole, the flat surfaces 111 form parts of the sides of a square prism B, the rounded sectors 12 join the flat surfaces and correspond to parts of a cylindrical surface A with a preset diameter D, and the flat surfaces 11 are on the inner side of the circumference of said cylindrical surface—FIGS. 1 and 2.

Figure 1:
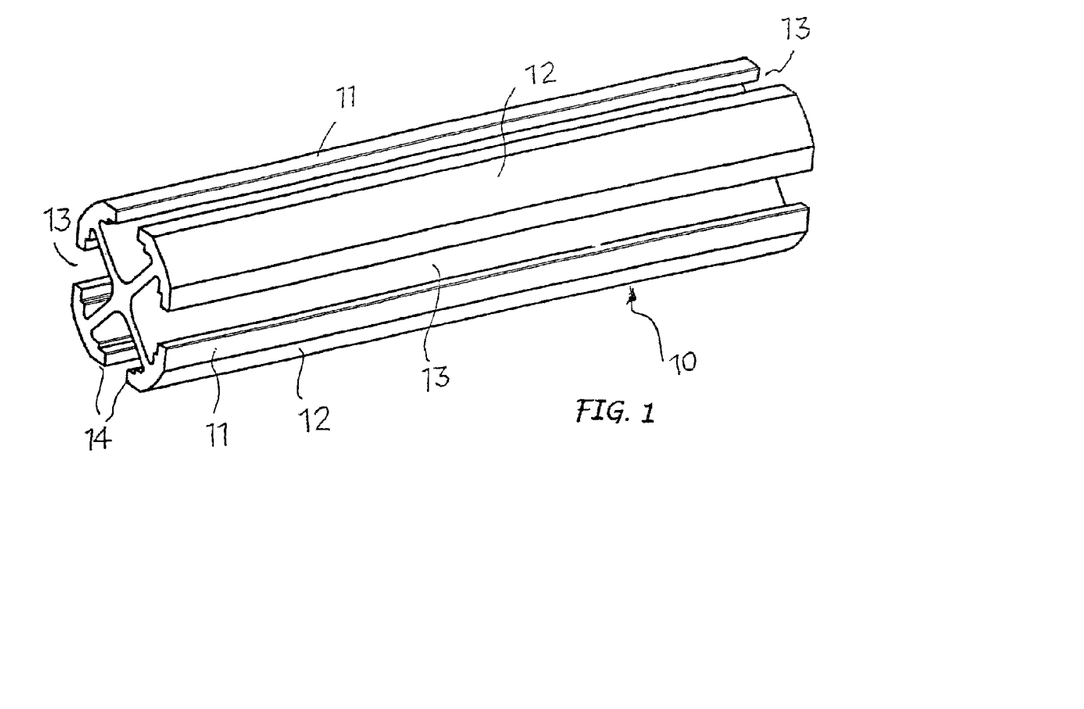
FIG. 1 shows a view of a bar section in perspective according to the invention.
Figure 2:
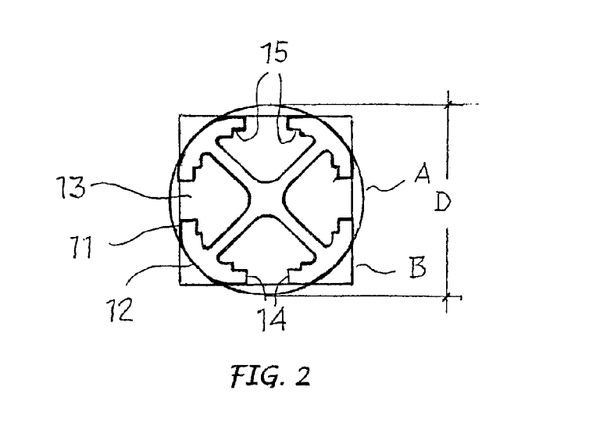
FIG. 2 shows an end view thereof.

A groove 13 is cut along each flat surface 11 with an opening formed by two parallel borders 14 defining internally, from opposite sides of the groove, two corresponding undercuts 15 the surface of which can be longitudinally grooved.

The section element 10 shaped in this way can be connected to other similar elements in various ways and even to conventional round and square tubes, by means of usual clamps for round or square tubes. The rounded sectors 12 define round outer surface engagement means for engagement by a round engagement part (e.g., a usual clamp for round tubes). The flat surfaces 11 define polygon outer surface engagement means for engagement by a polygonal engagement part (e.g., a usual clamp for square tubes).

Figures 3, 4:
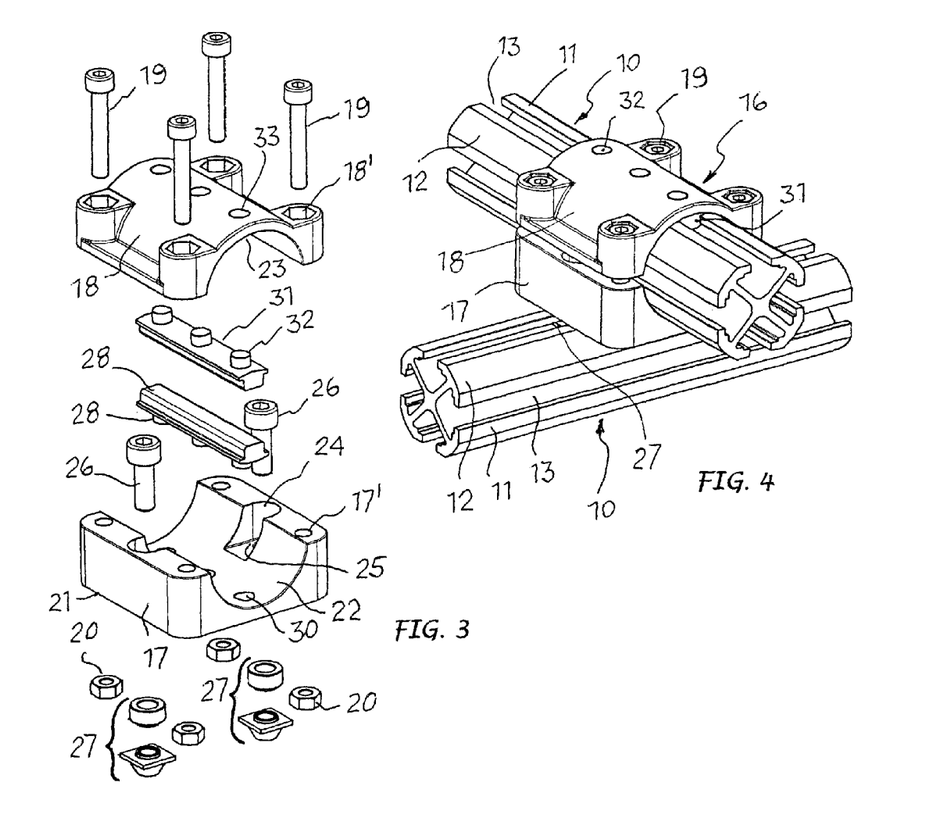
FIG. 3 shows an exploded view of a clamp for connecting a bar section to another one.
FIG. 4 shows two bar sections assembled with the clamp in FIG. 3.

But advantageously, this invention proposes a clamp 16 which can have different configurations, linear, at an angle, T, etc. and which is set up to connect up both to flat surfaces and to the cylindrical sectors of the section body 10.

The clamp 16 comprises a first block 17 and a second block 18 which overlap and lock together by means of a series of bolts 19 and nuts 20 engaging coincident bores 17', 18' machined respectively in the two blocks.

The first block 17 has a flat base 21 and forms a substantially semi-cylindrical notch 22 that extends in length between two opposite sides of the block itself and that is open towards the second block 18. This second block delimits in its turn a substantially semi-cylindrical notch 23, facing towards the notch 22 of the first block to form with it, when the clamp 16 is assembled, a cylindrical housing the diameter D of which is compatible with the cylindrical sectors 12 of the section body 10.

At least in the first block 17, on opposite sides of its semi-cylindrical notch 22, two recesses 24 are provided and in correspondence with each recess there is a bore 25 perpendicular to the flat surface 21 of the block itself. The bores 25 in said recesses 24 are provided to host bolts 26 to fix the clamp directly to any flat surface 11 of the section body 10 with the help of threaded anchoring elements 27 placed in the groove 13 running along a surface and engaging with the undercuts on the walls of said groove 13. The anchoring elements 27 can be the same shape as the so-called hammer nuts or plates with a threaded hole in which to thread the bolts 26.

On the bottom of the semi-cylindrical notch 22 at least in the first block 17 of the clamp, a centring member 28 is located, which is overhanging and designed to engage the opening of any groove 13 with the function of preventing the clamp from turning on the body section it is associated with and acting as a guide for the linear movement and positioning of the clamp along the flat surfaces 11 of said section body.

The centring member 28 can, for example, be in the shape of a key as shown in the drawing, it is applied in the semi-cylindrical notch and it can be removed to be used only when required. In order to be removed when needed, the centring device 28 can be provided with pins 29 which fit unto corresponding holes 30 provided in the bottom of the respective semi-cylindrical notch 22.

A similar centring member 31 can be associated in the same way and with the same functions to the semi-cylindrical notch 23 of the second block 18 of the clamp, said centring member 31 being provided with pins 32 designed to engage in holes 33 machined in the bottom of said notch 23.

The clamp 16, on its own or connected to others, enables the connection of the section body 10 with other similar sections, using each time their flat surfaces, that is the prismatic part, or their cylindrical section.

Figure 5:
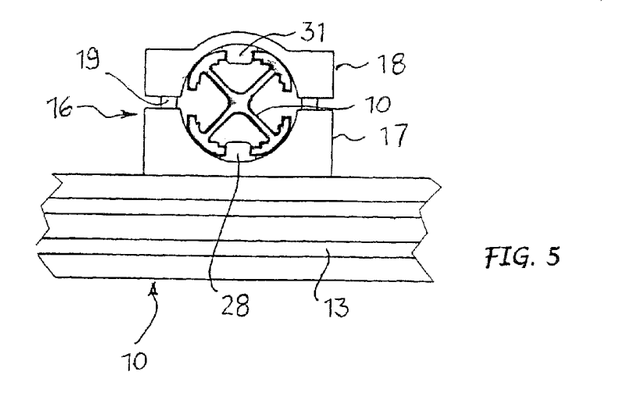
FIG. 5 shows a side view of the group in FIG. 4.
Figure 6:
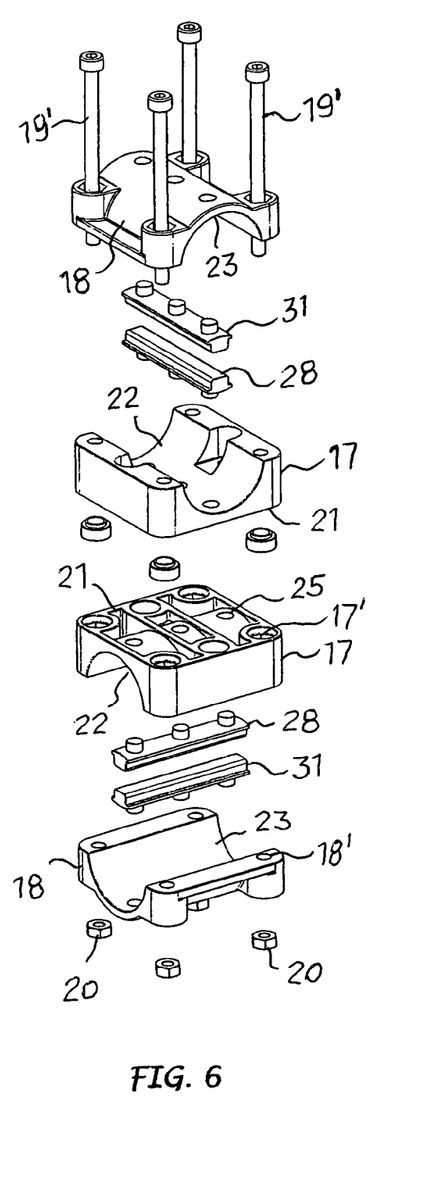
FIG. 6 shows an exploded view of a pair of clamps for joining two octagonal bar sections.
Figure 7:
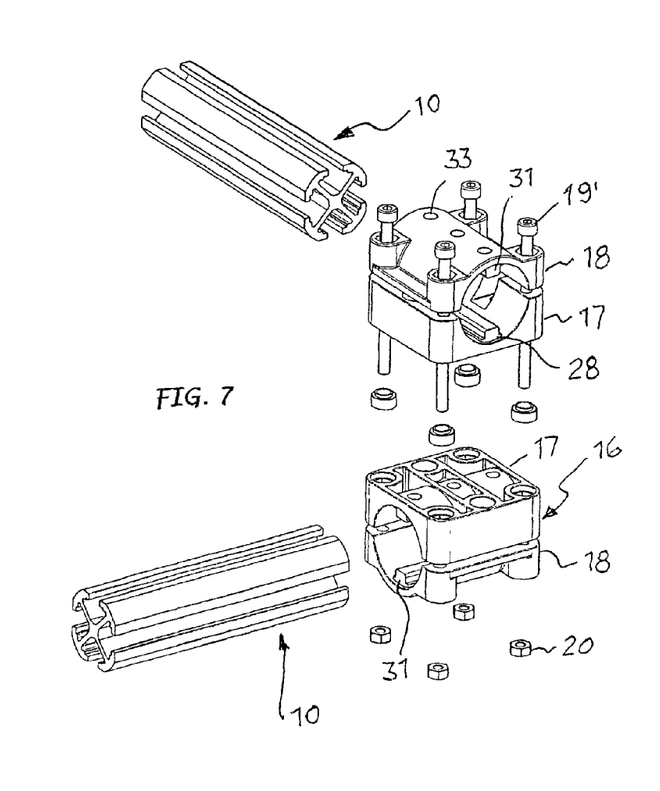
FIGS. 7 and 8 show the pair of clamps in FIG. 6 before and after connection of the two octagonal bar sections.
Figure 8:
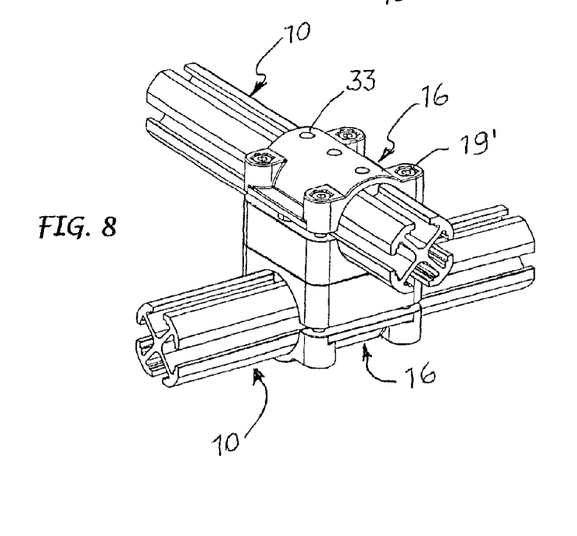
Figure 9:
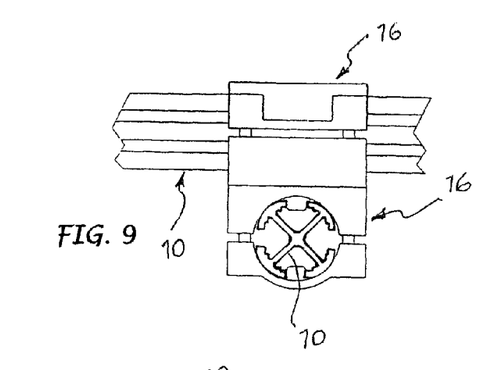
FIG. 9 shows a side view of the group in FIG. 8.
Figure 10:
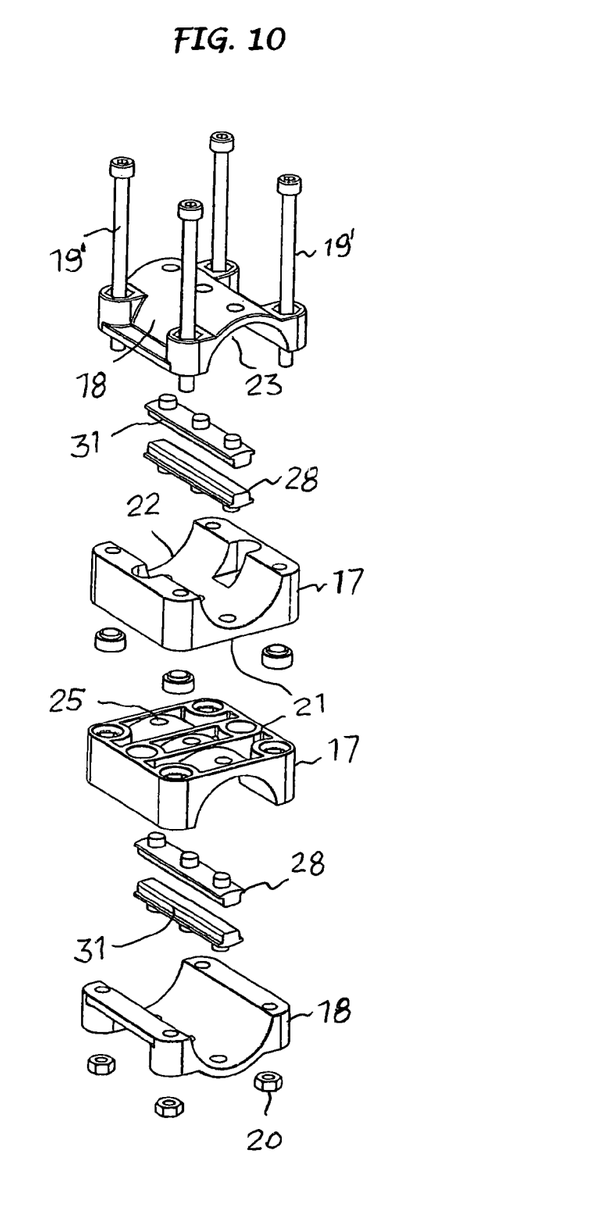
FIG. 10 shows an exploded view of a pair of clamps for connecting two parallel bar sections.
Figure 11:
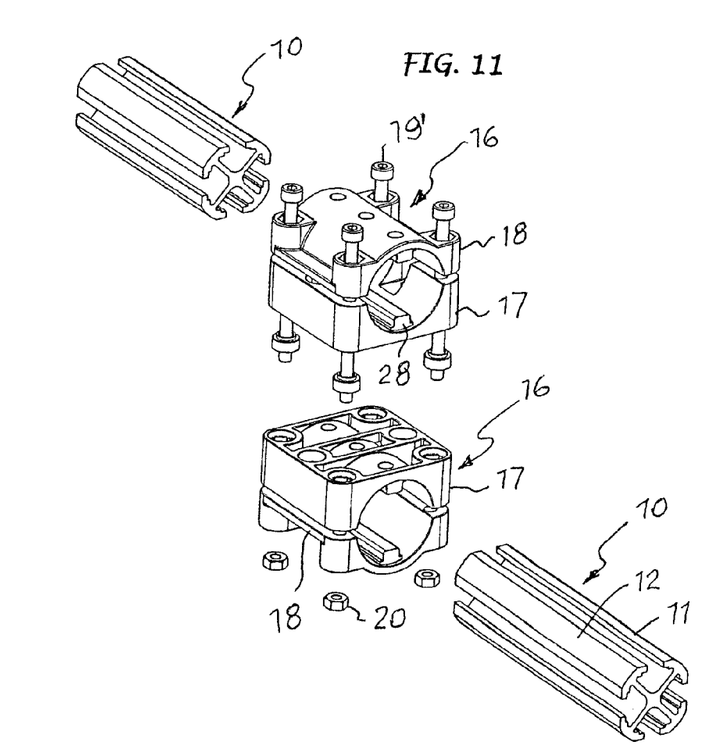
FIGS. 11 and 12 show the pair of clamps in FIG. 10 before and after connecting the two parallel bar sections.
Figures 12, 13:
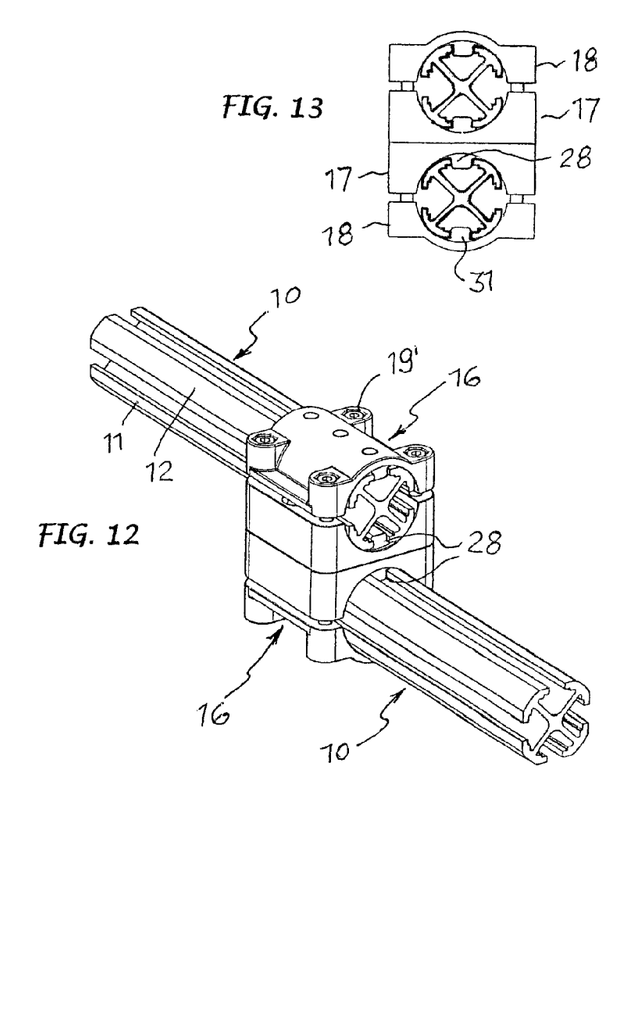
FIG. 13 shows a side view of the group in FIG. 12.

In fact, a clamp 16 can be fixed on any flat surface 11 of the section body 10 and used to block another section body 10 in the housing formed by the respective blocks 17, 18. In this way, the first block 17 is fixed to a groove 13 of a flat surface 11 of the section 10 by inserting bolts 26 in the bores 25 in the bottom of recesses 24 in the walls of the semi-cylindrical recess 22 of said block and engaging with the anchoring elements 27 that are provided in said groove and which engage the undercuts 15 inside the latter—FIGS. 4 and 5. Then, between the first block 17 and the second block 18 of the same clamp 16 there can be a second section body 10 placed and held in position. This other section body can be blocked by connecting the blocks of the clamp 17, 18 together, by using a set of nuts and bolts 20, 19 so as to tighten them around the cylindrical sector of the second section body without using the centring members 28, 31. In this case, the section, before blocking it, can be turned at an angle as required on its longitudinal axis.

By applying the centring members 28, 31 on the bottom of the semi-cylindrical notches 22, 23 of the clam blocks 17, 18, the section element may on the other hand be blocked in the clamp according to a set angle and corresponding to the flat surfaces 11. Consequently, in fact, the centring members engage the section element in the respective grooves 13, stopping it from turning.

It is also possible to pair the clamps 16 to join two sections 10 using a cross formation—FIGS. 6-9—or parallel—FIGS. 10-13—each held and blocked in the cylindrical housing by a respective clamp, with or without centring members 28, 31. The clamps are paired by resting the base 21 of the first block 17 of one clamp to the base 17 of the first block 21 of the other clamp and fixing all the blocks of both clamps together using suitable length bolts 19' to tighten the sections 10 together.

Figure 14:
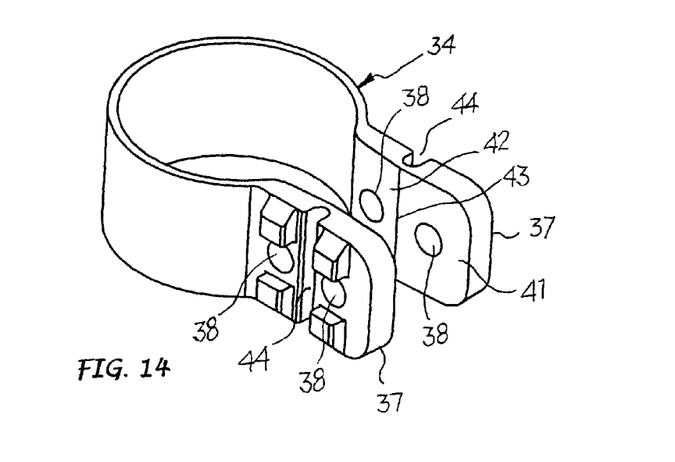
FIG. 14 shows a tie type clamp.
Figure 15:
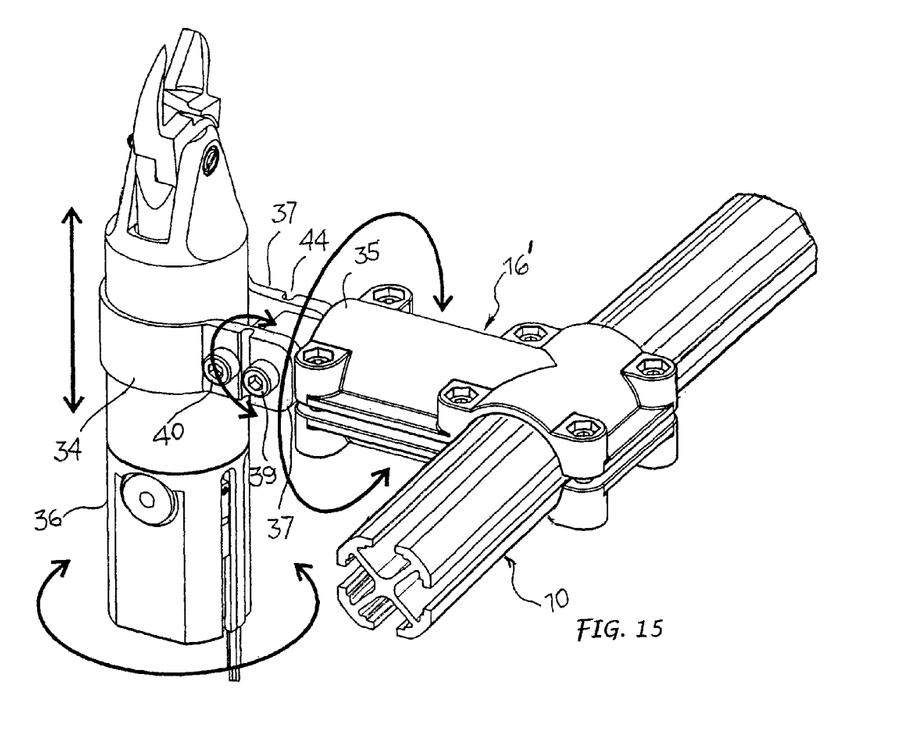
FIG. 15 shows an example of a use of the clamp in FIG. 14 for connecting the two elements.

By using a C clamp that is a tie clamp 34 as shown in FIG. 14 it will also be possible to block two elements 35, 36 independently, e.g. two tubes or sections together or a tube or section with a tool or another device as shown in the example in FIG. 15, with the possibility of turning or directing an element differently from the other. The example of FIG. 15 uses an alternate clamp 16'.

For this purpose, the tie clamp has two protruding tabs 37 each having a pair of bores 38 coinciding with the ones in the other to receive crossways, two blocking screws 39, 40, The internal face of each tab 37 has two planes 41, 42 inclined in opposite directions which converge in an apex, resulting between the pair of bores and acting as an intermediate fulcrum 43. Externally each tab has a groove 44 which facilitate flexibility when the tabs are engaged crossways by screws 39, 40.

Practically, the tie clamp 34 is connected by a first screw 39 to a first element 35 and by another screw 40 to another element 36 to be associated with the first. Thanks to the intermediate fulcrum 43, by fully tightening the first screw 39 and not the other screw 40 the clamp can be firmly blocked to the first element 35, leaving the second element 36 loose so that it can be turned and/or moved axially in the clamp. On the contrary, by fully tightening the second screw 40 and not the first one 39, it is possible to firmly block the second element 36 in the clamp and move the latter with respect to the first element 35 to which it is connected by said first screw. By firmly tightening both screws 39, 40 it will be possible to rigidly block the first and second elements without the possibility of moving one with respect to the other.

The invention claimed is:

1. A section element combination for connection to one or more of similar sections and tubes or bars having round or square cross-section, the section element combination comprising:

a section body having an outer circumference defined by sections of flat surfaces and rounded sectors and having a preset diameter, said rounded sectors defining round outer surface engagement means configured for engagement with a round engagement part and said flat surfaces defining polygonal outer surface engagement means configured for engagement with a polygonal engagement part, and each flat surface having longitudinal groove with parallel borders forming an opening and undercuts on opposite side of said groove;

connecting clamps for clamping connection with said section body, each connecting clamp defining at least one semi-cylindrical housing region with an inner surface in contact with each of said rounded sectors in a clamp position with a diameter corresponding to said circumference preset diameter of said section body and having a centering member extending into said semi-cylindrical housing region, said centering member having a semi-cylindrical head corresponding to the inner surface of semi-cylindrical housing region to fit the centering member in removable form to the semi-cylindrical housing region along at least one of said flat surfaces and a key depending therefrom to extend into the opening of any of the grooves of the section body to prevent said section body from turning.

2. A section element combination according to claim 1, wherein the section body has four flat surfaces and four rounded sectors which are alternate with said flat surfaces, so that said flat surfaces correspond to a same number of parts of the sides of a square prism for the use of the body section as a square cross-sectioned tube or bar, and that said rounded sectors correspond to an equal number of parts of a cylindrical surface for use of the section body as a round bar or tube, the flat surfaces being on an inner cylindrical surface defined by the rounded sectors.

3. A section element combination according to claim 1, wherein each of said connecting clamps is made up of a first clamp block and of a second clamp block connected and blocked one on top of said first clamp block and of a second clamp block by nuts and bolts, engaged in coincident bores formed in said blocks, and wherein the first block has a flat base and defines a semi-cylindrical notch surface open towards the second block and said second block defines a semi-cylindrical notch surface facing towards the notch surface of the first block so as to form with said first block, when the first clamp block and the second clamp block are assembled, the cylindrical housing diameter corresponding to the outer circumferential diameter.

4. A section element combination according to claim 3, wherein both the first and second clamp blocks are equipped with a removable said centering member designed to engage into the opening of a respective groove along the flat surfaces of the section body.

5. A section element combination according to claim 3, further comprising anchoring elements, wherein from opposite walls of the semi-cylindrical notch surface at least of the first clamp block, two recesses are provided each with a bore perpendicular to the flat base, each bore in the respective one of said two recesses receiving bolts for fixing the clamp directly to any one of the flat surfaces of another section body with said anchoring elements placed in a groove running along said flat surface and engaging with undercuts in walls of said groove of said another section body.

6. A section element combination according to claim 3, wherein each clamp has a cross shape and is connectable to another of said clamps is connectable to another of said clamps by fitting the flat base of the first block of one of said clamps to a flat base of a first block of another of said clamps.

7. A section element combination for connection to one or more of similar sections and tubes or bars having round or square cross-section, the section element combination comprising:

a section body having an outer circumference defined by sections of flat surfaces and rounded sectors and having a preset diameter, said rounded sectors defining round outer surface engagement means configured for engagement with a round engagement part and said flat surfaces defining polygonal outer surface engagement means configured for engagement with a polygonal engagement part, and each flat surface having a longitudinal groove with parallel borders forming an opening and forming undercuts on opposite each side of said groove;

connecting clamps for clamping connection with said section body, each connecting clamp defining at least one semi-cylindrical housing region with an inner surface in contact with each of said rounded surface sections in a clamp position and with a diameter corresponding to said circumference preset diameter of said section body and having a centering member extending into said semi-cylindrical housing region, said centering member having a semi-cylindrical head corresponding to the inner surface of semi-cylindrical housing region to fit the centering member in removable form to the semi-cylindrical housing region along at least one of said flat surfaces and a key depending therefrom to extend into the opening of any of the grooves of the section body to prevent said section body from turning, wherein each of said connecting clamps is made up of a first clamp block and of a second clamp block connected and blocked one on top of said first clamp block by nuts and bolts, engaged in coincident bores formed in said blocks, and wherein the first block has a flat base and defines a semi-cylindrical notch surface open towards the second block and said second block defines a semi-cylindrical notch surface facing towards the notch surface of the first block so as to form with said first clamp block, when the first clamp block and second clamp block are assembled, the cylindrical housing diameter corresponding to the outer circumferential diameter.

8. A section element combination according to claim 7, wherein the section body has four flat surfaces and four rounded sectors which are alternate with said flat surfaces, so that said flat surfaces correspond to a same number of parts of the sides of a square prism for the use of the body section as a square cross-sectioned tube or bar, and that said rounded sectors correspond to an equal number of parts of a cylindrical surface for use of the section body as a round bar or tube, the flat surfaces being on an inner cylindrical surface defined by the rounded sectors.

9. A section element combination according to claim 8, wherein both the first and second clamp blocks are equipped with a removable said centering member designed to engage into the opening of a respective groove along the flat surfaces of the section body.

10. A section element combination according to claim 7, further comprising anchoring elements, wherein from opposite walls of the semi-cylindrical notch surface at least of the first clamp block, two recesses are provided each with a bore perpendicular to the flat base, the bores in said two recesses receiving bolts for fixing the clamp directly to any one of the flat surfaces of another section body with said anchoring elements placed in a groove running along said flat surface and engaging with undercuts in walls of said groove of said another section body.

11. A section element combination according to claim 7, wherein each of said clamps is connectable to another of said clamps by fitting the flat base of the first block of one of said clamps to a flat base of a first block of another of said clamps.

12. A section element combination for connection to one or more of similar sections and tubes or bars having round or square cross-section, the section element combination comprising:
a section body having an outer circumference defined by four flat surface sections and four rounded surface sections and having a preset diameter, said rounded sections defining round outer surface engagement means configured for engagement with a round engagement part and said flat surfaces defining polygonal outer surface engagement means configured for engagement by a round engagement part with said flat surface sections corresponding to a same number of parts of sides of a square prism for the use of the body section as a square cross-sectioned tube or bar for engagement by the polygonal engagement part, and said rounded surface sections lying in a circle and corresponding to an equal number of parts of a circular cylindrical surface for use of the section body as a round bar or tube for engagement by a round engagement part, the flat surface sections defining said square prism inward of the circle of the circular cylindrical surface defined by the rounded sectors and each of said flat surface sections having a longitudinal groove with parallel borders forming an opening and forming undercuts on each side of said groove;
connecting clamps for clamping connection with said section body, each connecting clamp defining at least one semi-cylindrical housing region with an inner surface in contact with each of said four rounded surface sections in a clamp position and with a diameter corresponding to said circumference preset diameter of said section body and having a centering member extending into said semi-cylindrical housing region, said centering member having a semi-cylindrical head corresponding to the inner surface of semi-cylindrical housing region to fit the centering member in removable form to the semi-cylindrical housing region along at least one of said flat surfaces and a key depending therefrom to extend into the opening of any of the grooves of the section body to prevent said section body from turning.

13. A section element combination according to claim 12, wherein each of said connecting clamps is made up of a first clamp block and of a second clamp block connected and blocked with one on top of said first clamp block by nuts and bolts, engaged in coincident bores formed in said blocks, and wherein the first block has a flat base and defines a semi-cylindrical notch surface open towards the second block and said second block defines a semi-cylindrical notch surface facing towards the notch surface of the first block so as to form with said first block, when the first clamp block and the second clamp block are assembled, the cylindrical housing diameter corresponding to the outer circumferential diameter.

14. A section element combination according to claim 13, wherein both the first and second clamp blocks are equipped with a removable said centering member designed to engage into the opening of a respective groove along the flat surfaces of the section body.

15. A section element combination according to claim 13, further comprising anchoring elements, wherein from opposite walls of the semi-cylindrical notch surface at least of the first clamp block, two recesses are provided each with a bore perpendicular to the flat base, the bores in said two recesses receiving bolts for fixing the clamp directly to any one of the flat surfaces of another section body with said anchoring elements placed in a groove running along said flat surface and engaging with undercuts in walls of said groove of said another section body.

16. A section element combination according to claim 13, wherein each of said clamps is connectable to another of said clamps by fitting the flat base of the first block of one of said clamps to a flat base of a first block of another of said clamps.

* * * * *